United States Patent Office 3,466,317
Patented Sept. 9, 1969

3,466,317
CYANO ACETALS
Donald G. Kuper, Bartlesville, Okla., assignor to Phillips Petroleum Company, a corporation of Delaware
No Drawing. Filed Dec. 12, 1966, Ser. No. 600,793
Int. Cl. C07c *121/08, 121/02*
U.S. Cl. 260—465.6                           9 Claims

ABSTRACT OF THE DISCLOSURE 3-cyano acetals are prepared at relatively low pressures from a nitrile, an alcohol, CO and $H_2$ in the presence of a Group VIII metal containing hydrogenation catalyst by adding an acid.

---

This invention relates to the production of cyano acetals. In one aspect it relates to a process for the preparation of 3-cyano acetals. In another aspect it relates to the use of the 3-cyano acetals as a selective solvent.

Known methods for the synthesis of acetals containing nitrile groups in the molecule have, in general, been unsatisfactory and not economical. The common procedure hitherto employed for the preparation of acetals have required high pressures, i.e., pressures of 600 atmospheres or higher and preferably 1200 atmospheres of pressure to carry out the synthesis of acetals from acrylonitrile, carbon monoxide, hydrogen, and alcohols.

An object of the invention is to provide a method for the production of cyano acetals.

Another object of this invention is to provide a new selective solvent for solvent extraction for separating mixtures of aromatic, aliphatic, and cycloaliphatic hydrocarbons.

Other objects and advantages of this invention will be apparent to one skilled in the art from a study of the following description and appended claims.

According to the invention I have found that acids, both inorganic and organic, promote the $Co_2(CO)_8$ catalyzed production of 3 - cyano acetals from a nitrile of the formula $CH_2=CR-C\equiv N$ where R is H, or an alkyl radical containing from 1 to 4 carbon atoms, hydrogen, alcohols, and carbon monoxide at much lower pressures than have previously been known. The use of the acid promoters of this invention enables the implementation of the reaction of the process at pressures as low as 60 atmospheres. However, pressures between 80 and 240 atmospheres are preferred. The reduced pressures resulting from the use of an acid promoter results in significant economical savings of operation and expense for equipment. In addition, costly polymerization inhibitors are not needed to prevent undesired side reactions.

Further according to the invention I have found that 3-cyano acetals are selective solvents for the extraction of members of different classes of hydrocarbons in a mixture of hydrocarbons such as aromatic hydrocarbons from paraffin hydrocarbons, paraffin hydrocarbons from olefin hydrocarbons, monoolefin hydrocarbons from diolefin hydrocarbons and cyclo hydrocarbons from open chain hydrocarbons.

Alcohols that can be employed in the process according to the present invention can be represented by the formula:

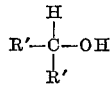

where R' can be H, and/or radicals such as alkyl, cycloalkyl, aryl, and combinations thereof such as cycloalkyl and aralkyl, and the total number of carbon atoms in the alcohol ranges from about 1–30. The preferred alcohol is a primary monohydric alcohol, particularly alkanols containing from about 1 to 4 carbon atoms per molecule.

Examples of suitable alcohols to be used according to the present invention include methanol, ethanol, isopropanol, butanol, butan-2-ol, dodecan-4-ol, 3 - cyclohexyldodecanol, octanol, 2-propanol, tricontanol, 6-tricontanol, cyclododecanol, 3-methyl - 4 - ethyldodecanol, 4-cyclohexyl-2-dodecanol, 6-phenyldodecan-2-ol, 2-phenyl-6-nonanol, 3-hexanol, 1,1-dimethyl-4-undecanol, and the like.

The invention is carried out by admixing the reactants in a reactor to form a reaction mixture, heating the reaction mixture at reaction temperatures and pressures within the range of about 80°–260° C. and above 60 atmospheres, preferably between 80 and 240 atmospheres, with a hydrogenation catalyst, preferably one selected from the metals of the VIII Group of the Periodic Table and an acid promoter. Cobalt and ruthenium catalysts have been particularly effective. The catalysts are generally employed in excess of 0.1 weight percent of the catalyst per weight of the nitrile compound present, and preferably between 1 and 15 weight percent catalyst.

The term acid as employed in the present specification includes both organic and inorganic acids. The inorganic acids which are adapted to promoting the catalyzed production of 3-cyano acetals include sulfuric acid, hydrochloric acid and phosphoric acid. The organic acids which can be used in the production of the 3-cyano acetals according to the invention are carboxylic acids having at least one carboxyl group and having 1–20 carbon atoms per molecule. The organic acid can also contain halogen, hydroxyl and alkoxyl substituents and can be both saturated or unsaturated acids. Examples of suitable organic acids are acetic, formic, citric, oxalic, propionic, benzoic, o-bromobenzoic, chloroacetic, dichloroacetic, diethylmalonic, ethylmalonic, tartaric, lactic, maleic, malonic, p-methoxybenzoic, succinic, salicylic and eicosanoic acids. It is apparent that the foregoing exemplified acids, but for any carboxyl, halogen, hydroxyl or alkoxyl groups present, are hydrocarbon in composition. The nitriles which have particular utility in the practice of the present invention are represented by the formula:

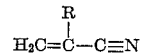

where R can be H or an alkyl radical containing from 1 to 4 carbon atoms, such as 2 - methylacrylonitrile, 2-n-butylacrylonitrile, 2 - n - propylacrylonitrile, acrylonitrile, 2-ethylacrylonitrile, 2-isopropylacrylonitrile, and the like.

In operation the nitrile is admixed in a reactor with the catalytic compound, the acid compound, and the solvent. The alcohol, is preferably present in such proportion that at least two active hydroxyl groups per one molecule of the nitrile are available. The carbon monoxide and hydrogen, the synthesis gas, are then added to the reaction vessel to produce the desired reaction pressure. The molar ratio of carbon monoxide to hydrogen in the synthesis gas ranges from about 0.5 to 2. In general, the molar ratio of carbon monoxide to hydrogen is maintained about 1. It is desirable to maintain the carbon monoxide in an amount at least molarly equivalent initially to the nitrile. Small molar excesses of carbon monoxide have been found to be advantageous in carrying out the reaction. Graphically, the above-mentioned reaction can be represented by:

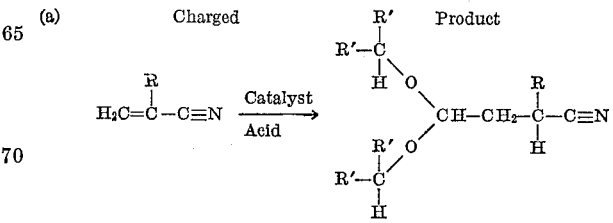

(b)
$$R'-\underset{\underset{H}{|}}{\overset{\overset{R'}{|}}{C}}-OH$$

(c) CO (d) $H_2$ where the nitrile compounds, alcohols, catalysts, and acids are as have been previously defined.

The more detailed practice of this invention is illustrated by the following examples.

Example I

A 2000 ml. stainless steel reactor was charged with a reaction mixture comprising 1.5 grams of $Co_2(CO)_8$, 120 grams of acrylonitrile, 2 ml. of glacial acetic acid, and 900 ml. of methanol. The reactor was then purged with a synthesis gas comprising carbon monoxide and hydrogen in a mol ratio of 1, and then the reactor was pressured to about 163 atmospheres with such synthesis gas. The reaction mixture was heated to about 127° C. and a pressure of about 211 atmospheres. The reaction mixture was maintained at about 127° C. and 211 atmospheres for a period of about 4 hours. The pressure was then released from the reactor, the methanol was stripped, and the concentrate was distilled to recover 213 grams of 4,4-dimethoxybutyronitrile (B.P. 91–95° F. at 10 mm. Hg).

Example II

For a control run without the use of acid, a 1000 ml. stainless steel reactor was charged with a reaction mixture comprising 80 grams acrylonitrile, 1 gram $Co_2(CO)_8$, and 500 ml. methanol. The reactor was then purged with a synthesis gas comprising carbon monoxide and hydrogen present in a mol ratio of 1, and the reactor was then pressured to about 149 atmospheres with the synthesis gas. The reaction mixture was then heated to about 135° C., a pressure of about 197 atmospheres, and maintained at that temperature and pressure for a period of 4 hours. The pressure was then released from the reactor, and the methanol was distilled off. Distillation of the remaining concentrate in vacuo effected the recovery of only 5 grams of impure material that distilled between 70 and 100° F. at 10 mm. Hg.

The control run, Example II, clearly demonstrates a lack of practical reaction and the failure of the reaction without acidic promoters. Therefore, the above examples show that the presence of the acid promoters is necessary for the reaction to be carried out at relatively low pressures.

Example III

A stainless steel reactor was charged with a reaction mixture comprising 0.5 gram of $Co_2(CO)_8$, 0.15 gram of $H_3PO_4$ (85 percent strength), 26.5 grams of acrylonitrile and 150 ml. of methanol. The reaction was effected as in Example I above under similar conditions. Upon termination of the reaction 28.1 grams of 4,4-dimethoxybutyronitrile was recovered.

Example IV

A stainless steel reactor was charged with a reaction mixture comprising 1.0 gram of $Co_2(CO)_8$, 1.0 ml. of glacial acetic acid, 50 grams of acrylonitrile, and 200 ml. of isopropanol. After the system had been purged with synthesis gas, it was pressured to 170 atmospheres with synthesis gas at room temperature, and then the temperature was raised to 127° C. and a pressure of about 211 atmospheres. The reaction mixture was maintained at these reaction conditions for 2 hours. The pressure was then released from the reactor, and the isopropanol was stripped. The concentrate on separation yielded 23.9 grams of 4,4-diisopropoxybutyronitrile.

Example IV clearly demonstrates that secondary alcohols are useful in the process of the present invention.

The above examples clearly demonstrate that 3-cyano acetals can be produced at relatively low pressures with the utilization of an acid promoter.

The 3-cyano acetals produced by the process of the present invention can be employed as selective solvents in the extraction of members of different classes of hydrocarbons in a mixture of hydrocarbons. The 3-cyano acetals are particularly useful as selective solvents for the extraction of aromatic hydrocarbons from mixtures containing aromatic hydrocarbons, aliphatic hydrocarbons, and cycloaliphatic hydrocarbons. Such is of particular value when the components of the mixture have similar boiling points. If desired, a small amount of water can be present to aid in the extraction process. The extraction process of the present invention can be carried out by batch or continuous methods employing conventional equipment well known in the art.

Examples of hydrocarbon mixtures in which the 3-cyano acetals can be employed as a selective solvent are the separation of anthracene from a mixture of anthracene and octane, the separation of diphenyl from a mixture of diphenyl and tricosane, the separation of anthracene from a mixture of anthracene and docasane, the separation of benzene from a mixture of benzene and hexane, the separation of xylene from a mixture of xylene and pentane, the separation of toluene from a mixture of toluene and pentane, and the like.

Example V

Two runs were carried out. In each run, 10 grams of a mixture of benzene and heptane and 10 grams of 4,4-dimethoxybutyronitrile were shaken at room temperature in a separatory funnel. One of the benzeneheptane mixtures contained 10 weight percent benzene and 90 weight percent heptane; the other benzene-heptane mixture contained 20 weight percent and 80 weight percent heptane. After having been shaken, each of the mixtures of benzene, heptane, and 4,4-dimethoxybutyronitrile was allowed to stand, whereupon two layers separated. The upper raffinate and the lower extract phases were each analyzed by gas chromatography, and the selectivity of the solvent for benzene was calculated. The results are summarized in the following table:

| Hydrocarbon mixture used | Ratio solvent:benzene:heptane, by weight [1] | | Ratio benzene:heptane, by weight | | Selectivity of solvent for benzene [3] |
|---|---|---|---|---|---|
| | Extract phase | Raffinate phase | Extract phase | Raffinate phase | |
| 10 weight percent benzene, 90 weight percent heptane | | | 29:71 | 5:95 | 7.7 |
| 20 weight percent benzene | 83.0:7.6:9.4 | 8.2:9.5:82.3 | 45:55 | 11:89 | 6.6 |

[1] Determined by gas chromatography in conjunction with distillation of hydrocarbons from solvent.
[2] Weight of benzene in extract × weight of heptane in raffinate
Weight of benzene in raffinate × weight of heptane in extract
See, e.g., Treybal, "Liquid Extraction," McGraw-Hill Book Company, Inc., New York [1951], 1st ed., p.p. 88, 89.

The table above clearly shows that extraction of each of the benzene-heptane mixtures with 4,4-dimethoxybutyronitrile resulted in enrichment of benzene relative to heptane in the extract phase and enrichment of heptane relative to benzene in the raffinate phase, thereby demonstrating the utility of 4,4-dimethoxybutyronitrile as a selective solvent for the extraction of benzene from a mixture containing benzene and heptane.

While utility of the 4,4-dimethoxybutyronitrile produced according to the present invention has been shown by Example V, the product of the reaction is also useful as an intermediate for the preparation of pharmaceuticals and dyestuffs and as a pest control agent.

The foregoing detailed description has been given for clearness of understanding and no unnecessary limitations are to be understood therefrom. The invention is not limited to the exact details shown and description for obvious modifications will occur to those skilled in the art.

What is claimed is:

1. In a process for the preparation of a 3-cyano acetal by reacting a reaction mixture containing a nitrile represented by the formula $CH_2=CR-C\equiv N$ wherein R is hydrogen or an alkyl radical containing from 1 to 4 carbon atoms, alcohol represented by the formula

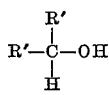

wherein each R' is selected from the group consisting of hydrogen, alkyl, cycloalkyl, aryl, and combinations thereof, the total number of carbon atoms in said alcohol ranging from about 1–30, CO, and $H_2$ in the presence of a Group VIII metal containing hydrogenation catalyst and at a pressure of at least 60 atmospheres, the improvement comprising adding an acid to said reaction mixture, wherein said acid is sulfuric acid, hydrochloric acid, phosphoric acid, or a carboxylic acid having 1 to 20 carbon atoms per molecule and containing at least one carboxyl but being otherwise hydrocarbon or such a carboxylic acid containing halogen, hydroxyl or alkoxyl substituents.

2. A process according to claim 1 wherein said nitrile is acrylonitrile, said acid is glacial acetic acid, and said alcohol is methanol or isopropanol.

3. A process according to claim 1 wherein said Group VIII metal containing catalyst is $Co_2(CO)_8$.

4. A process according to claim 1 wherein said acid is glacial acetic acid.

5. A process according to claim 1 wherein said reaction mixture is pressured with the CO and $H_2$ to a pressure within the range of about 80–240 atmospheres and said reaction mixture is heated to a temperature within the range of about 80–260° C.

6. A process according to claim 1 wherein said alcohol is an alkanol having from 1–4 carbon atoms and said Group VIII metal containing hydrogenation catalyst is selected from the group consisting of cobalt and ruthenium.

7. A process according to claim 1 which comprises:
(a) admixing in a reactor acrylonitrile, methanol, $Co_2(CO)_8$ and glacial acetic acid, to form a reaction mixture;
(b) purging the reactor with said synthesis gas of carbon monoxide and hydrogen, said carbon monoxide and hydrogen being present in a mol ratio of about 1;
(c) reacting said reaction mixture at a temperature within the range of about 80–260° C. and a pressure of about 80–240 atmospheres;
(d) stripping said methanol from said mixture to obtain a concentrate; and
(e) distilling said concentrate to recover 4,4-dimethoxybutyronitrile.

8. A process according to claim 1 which comprises:
(a) admixing in a reactor acrylonitrile, methanol, $Co_2(CO)_8$ and phosphoric acid to form a reaction mixture;
(b) purging the reactor with said synthesis gas of carbon monoxide and hydrogen, said carbon monoxide and hydrogen being present in a mol ratio of about 1;
(c) a reaction mixture at a temperature within the range of about 80–260° C. and a pressure of about 80–240 atmospheres;
(d) stripping said methanol from said mixture to obtain a concentrate; and
(e) distilling said concentrate to recover 4,4-dimethoxybutyronitrile.

9. A process according to claim 1 which comprises:
(a) admixing in a reactor acrylonitrile, isopropanol, $Co_2(CO)_8$ and glacial acetic acid to form a reaction mixture;
(b) purging the reactor with said synthesis gas of carbon monoxide and hydrogen, said carbon monoxide and hydrogen being present in a mol ratio of about 1;
(c) reacting said reaction mixture at a temperature within the range of about 80–260° C. and a pressure of about 80–240 atmospheres;
(d) stripping said isopropanol from said mixture to obtain a concentrate; and
(e) distilling said concentrate to produce 4,4-diisopropoxybutyronitrile.

References Cited

UNITED STATES PATENTS

| | | | |
|---|---|---|---|
| 2,506,571 | 5/1950 | Barrick et al. | 260—465.6 |
| 2,842,576 | 7/1958 | Habeshaw et al. | 260—465.6 XR |
| 3,210,400 | 10/1965 | Brakebill | 260—465.6 XR |
| 3,337,603 | 8/1967 | Kato et al. | 260—465.6 XR |

OTHER REFERENCES

Brewester, "Organic Chemistry," 2nd ed., 1953, page 161.

JOSEPH P. BRUST, Primary Examiner

U.S. Cl. X.R.

260—464,465, 666, 674, 675, 676, 677, 681.5, 705